United States Patent
Lin

(10) Patent No.: US 12,143,491 B2
(45) Date of Patent: Nov. 12, 2024

(54) SECURED PERFORMANCE OF AN ELLIPTIC CURVE CRYPTOGRAPHIC PROCESS

(71) Applicant: Irdeto B.V., Hoofddorp (NL)

(72) Inventor: Tingting Lin, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 266 days.

(21) Appl. No.: 17/895,588

(22) Filed: Aug. 25, 2022

(65) Prior Publication Data
US 2023/0085577 A1   Mar. 16, 2023

(30) Foreign Application Priority Data
Aug. 26, 2021 (EP) ..................................... 21193192

(51) Int. Cl.
*H04L 9/30* (2006.01)
*H04L 9/32* (2006.01)

(52) U.S. Cl.
CPC ............ *H04L 9/3066* (2013.01); *H04L 9/321* (2013.01); *H04L 2209/043* (2013.01)

(58) Field of Classification Search
CPC .. H04L 9/3066; H04L 9/321; H04L 2209/043; H04L 2209/16; H04L 9/3234; H04L 2209/046; H04L 9/30
See application file for complete search history.

(56) References Cited

U.S. PATENT DOCUMENTS 9,804,891 B1 * 10/2017 Adalier .................. H04L 9/3066
2010/0183142 A1 * 7/2010 Katagi .................... G06F 7/725
380/28

OTHER PUBLICATIONS

EP Appl No. 21193192.8-1218, European Search Report dated Sep. 2, 2022.
(Continued)

*Primary Examiner* — Quazi Farooqui
(74) *Attorney, Agent, or Firm* — Rimon PC; Marc S. Kaufman

(57) ABSTRACT

A method for performing an elliptic curve cryptographic process to generate output data based on input data, the elliptic curve cryptographic process based on an elliptic curve over a finite field, wherein the generation of the output data comprises generating, based on a predetermined point V of the elliptic curve and a positive R-bit integer k, a first point of the elliptic curve that is based, at least in part, on the point kV of the elliptic curve, wherein $k=\Sigma_{r=0}^{R-1} 2^r b_r$ and, for each $r=0, 1, \ldots, R-1$, $b_r$ is the bit value of k at bit position r of k, wherein the method comprises: storing, according to a partition of the R bit positions for k into T groups of bit positions $P_t$ ($t=0, 1, \ldots, T-1$), a corresponding lookup table $L_t$ having, for each of the $2^{|P_t|}$ possible options for assigning to the $|P_t|$ bit positions $s \in P_t$ a respective bit value $x_s$, a corresponding point of the elliptic curve that is based, at least in part, on the point $(\Sigma_{s \in P_t} 2^s x_s) V$ of the elliptic curve; obtaining k; and determining the first point as $\Sigma_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

17 Claims, 2 Drawing Sheets

(56) References Cited

OTHER PUBLICATIONS

Hwajeong Seo et al: "Secure Binary Field Multiplication", IACR, International Association for Cryptologic Research, vol. 20150810:181348 Aug. 10, 2015 (Aug. 10, 2015), pp. 1-12.

Jie Zhou et al: "White-Box Implementation of ECDSA Based on the Cloud Plus Side Mode", Security and Communication Networks, vol. 2020, Nov. 19, 2020 (Nov. 19, 2020), pp. 1-10.

Elliptic curve, Wikipedia; May 6, 2021; 12 pages; https://en.wikipedia.org/w/index.php?title=Elliptic_curve&oldid=1021743057.

Elliptic Curve Digital Signature Algorithm; Wikipedia; Jun. 30, 2021; 9 pages; https://en.wikipedia.org/w/index.php?title=Elliptic_Curve_Digital_Signature_Algorithm&oldid=1031148749.

Elliptic curve point multiplication; Wikipedia; Jul. 19, 2021; 7 pages; https://en.wikipedia.org/w/index.php?title=Elliptic_curve_point_multiplication&oldid=1034442896.

Elliptic-curve Diffie-Hellman; Wikipedia; Jul. 21, 2021; 3 pages; https://en.wikipedia.org/w/index.php?title=Elliptic-curve_Diffie-Hellman&oldid=1034716331.

Integrated Encryption Scheme; Wikipedia; Aug. 23, 2021; 3 pages; https://en.wikipedia.org/w/index.php?title=Integrated_Encryption_Scheme&oldid=1040293741.

\* cited by examiner

SECURED PERFORMANCE OF AN ELLIPTIC CURVE CRYPTOGRAPHIC PROCESS

FIELD OF THE INVENTION

The present invention relates to methods for secured performance of an elliptic curve cryptographic process, and systems and computer programs for carrying out such methods.

BACKGROUND OF THE INVENTION

Elliptic curves over a finite field F are well-known. The elliptic curve consists of the points (x,y) in F×F that satisfy $y^2 = x^3 + ax + b$, for coefficients a, b∈F that define the elliptic curve, together with a point $\mathcal{O}$ called the point at infinity. The elliptic curve forms an Abelian group, in which the point at infinity $\mathcal{O}$ acts as the group's identity element, and with the group having an addition operator+for adding together two points of the elliptic curve to form another point of the elliptic curve. Details of the addition operator are well-known and shall not, therefore, be described in more detail herein (however, see, for example, https://en.wikipedia.org/wiki/Elliptic_curve, the entire disclosure of which is incorporated herein by reference).

Multiplication of an elliptic curve point V (i.e. a point of, or on, the elliptic curve) by a positive integer k to produce the elliptic curve point kV, i.e. scalar multiplication, is well-known (see, for example, https://en.wikipedia.org/wiki/Elliptic_curve_point_multiplication, the entire disclosure of which is incorporated herein by reference). In particular, kV is defined as adding the point V to itself a further k−1 times, i.e. kV=V+V+V+ . . . +V.

The use of elliptic curves for cryptographic purposes is well-known. For this, the so-called "domain parameters" of the elliptic curve cryptographic process are agreed between the parties participating in the elliptic curve cryptographic process. Typically, the domain parameters will include: (1) an identification of the finite field F; (2) an identification of the elliptic curve over the finite field F (e.g. specifying the coefficients a, b∈F for the equation $y^2=x^3+ax+b$); (3) a "base point", or "generator point", G of the elliptic curve; and (4) the order of the point G, i.e. the smallest positive integer n for which nG=$\mathcal{O}$—here, n is usually prime. For the identification of the finite field F, this could, for example, involve specifying the prime number p if F is the Galois field GF(p), or specifying the degree τ and the field polynomial for F if F is the Galois field GF($2^\tau$). It will be appreciated that additional domain parameters may be specified (e.g. the cofactor h, i.e. the order the elliptic curve divided by n), and that the domain parameters may be represented in different ways.

Some examples of elliptic curve cryptographic process are set out below:

Example 1: Elliptic Curve Shared Secret Establishment

An example of elliptic curve shared secret establishment, namely Elliptic Curve Diffie-Hellman (ECDH) is set out below (more details of which can be found, for example, at https://en.wikipedia.org/wiki/Elliptic-curve_Diffie-Hellman, the entire disclosure of which is incorporated herein by reference). It will be appreciated that other methods of performing shared secret establishment using elliptic curves are possible.

Suppose Alice and Bob wish to establish a shared secret. As mentioned, they will first agree upon the domain parameters. Alice has a private key $d_A$ which is a randomly chosen integer in the range [1,n−1]; Alice's corresponding public key is the point $Q_A=d_AG$. Likewise, Bob has a private key $d_B$ which is a randomly chosen integer in the range [1,n−1]; Bob's corresponding public key is the point $Q_B=d_BG$.

Alice may generate the point $(p_x, p_y)=d_AQ_B$. Likewise, Bob may generate the point $d_BQ_A=d_Bd_AG=d_Ad_BG=d_AQ_B=(p_x, p_y)$. Thus, both Alice and Bob may calculate $p_x$ by only exposing their public keys (and agreeing the domain parameters) and can use $p_x$ as a shared secret (e.g. to generate a further key for a cryptographic process).

Example 2: Elliptic Curve Encryption and Decryption

An example of elliptic curve encryption and decryption is set out below (see, for example, https://en.wikipedia.org/wiki/Integrated_Encryption_Scheme, the entire disclosure of which is incorporated herein by reference, for more details). It will be appreciated that other methods of performing encryption and decryption using elliptic curves are possible.

Suppose Alice wishes to send Bob a message m. As mentioned, they will first agree upon the domain parameters. Bob has a private key $d_B$ which is a randomly chosen integer in the range [1,n−1]; Bob's corresponding public key is the point $Q_B=d_BG$.

Alice may encrypt the message m as follows:
(1) Generate a random integer r∈[1,n−1] and calculate W=rG.
(2) Generate $P=rQ_B$. If $P=\mathcal{O}$ then return to (1). Otherwise, set $s=p_x$ where $P=(p_x, p_y)$.
(3) Use a key derivation function (as known in this field of technology) to derive a symmetric key $k_E$ based on s.
(4) Use a symmetric encryption algorithm E (e.g. AES encryption) to encrypt the message m using the symmetric key $k_E$, thereby producing $c=E(m,k_E)$.
(5) Provide W and c as ciphertext to Bob.

Bob may decrypt the ciphertext as follows:
(1) Generate $s=p_x$, where $P=(p_x, p_y)=d_BW$ (noting that $d_BW=d_BrG=rQ_B$), so that Bob, knowing the private key $d_B$ and also knowing the point W provided by Alice, can generate the same field element s. Decryption fails if $P=\mathcal{O}$.
(2) Use the same key derivation function as Alice to derive the same symmetric key $k_E$ based on s.
(3) Use the symmetric decryption algorithm $E^{-1}$ corresponding to the symmetric encryption algorithm E used by Alice (e.g. AES decryption) to decrypt c using the symmetric key $k_E$, thereby producing $m=E^{-1}(c, k_E)$.

It is possible to include message integrity and/or authentication measures as part of this process too, as is well-known.

Example 3: Elliptic Curve Digital Signatures

An example of elliptic curve digital signature generation and verification, namely the Elliptic Curve Digital Signature Algorithm (ECDSA) is set out below (see, for example, https://en.wikipedia.org/wiki/Elliptic_Curve_Digital_Signature_Algorithm, the entire disclosure of which is incorporated herein by reference, for more details). It will be appreciated that other methods of performing digital signature generation and verification using elliptic curves are possible.

Suppose Alice wishes to send Bob a signed message m. As mentioned, they will first agree upon the domain parameters. Alice has a private key $d_A$ which is a randomly chosen integer in the range [1,n−1]; Alice's corresponding public key is the point $Q_A = d_A G$.

Alice may generate a signature for the message m as follows:
(1) Use a hash function H (e.g. SHA-2) to generate a hash h=H(m) of the message m.
(2) Set z to be the $a_n$ leftmost bits of h, where $a_n$ is the bit length of n.
(3) Generate a random integer k∈[1, n−1]
(4) Calculate the point $(x_1, y_1) = kG$.
(5) Calculate $r = x_1$ mod n. If r=0 then return to (3).
(6) Calculate $s = k^{-1}(z+rd_A)$ mod n. If s=0 then return to (3).
(7) The signature is the pair (r, s).

Bob may verify that Alice's signature (r, s) corresponds to the message m and Alice's public key $Q_A$ as follows:
(1) Check that $Q_A$ is a valid point of the elliptic curve, namely: (i) that $Q_A \neq \mathcal{O}$; (ii) that $Q_A$ lies on the curve; and (iii) that $nQ_A = \mathcal{O}$.
(2) Check that r and s are integers in the range [1, n−1]. If not, the signature is invalid.
(3) Use the same hash function H as Alice (e.g. SHA-2) to generate a hash h=H(m) of the message m.
(4) Calculate $u_1 = zs^{-1}$ mod n and $u_2 = rs^{-1}$ mod n, where z is the $a_n$ leftmost bits of h, where $a_n$ is the bit length of n.
(5) Calculate the point of the elliptic curve $(x_1, y_1) = u_1 G + u_2 Q_A$.
(6) If $(x_1, y_1) = \mathcal{O}$ then the signature is invalid.
(7) If $r \equiv x_1$ mod n then the signature is valid; otherwise the signature is invalid.

Cryptographic security of these elliptic curve cryptographic processes is based on the elliptic curve discrete logarithm problem (ECLDP) being computationally infeasible to solve. In particular, the ECLDP is: given elliptic curve points P and Q, find an integer k such that kP=Q. Given the computational difficulty of this problem, it is, for example, infeasible for an attacker to determine Alice's private key $d_A$ based on the public key $Q_A$ and the generator point G (where $Q_A = d_A G$).

However, it is important that the elliptic curve cryptographic processes are actually implemented in a secure manner too. A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker. Similarly, it would be desirable to prevent the attacker from modifying the execution/control flow of the item of software, for example preventing the attacker forcing the item of software to take one execution path after a decision block instead of a legitimate execution path.

White-box implementations of many block ciphers (such as AES) are now known and understood. However, white-box implementations for public/private key cryptographic algorithms, and in particular elliptic curve cryptographic processes, have proved more challenging to develop due to the nature of the data operations involved and the sizes of the data words being processed.

SUMMARY OF THE INVENTION

According to a first aspect of the invention, there is provided a method for performing an elliptic curve cryptographic process to generate output data based on input data, the elliptic curve cryptographic process based on an elliptic curve over a finite field, wherein the generation of the output data comprises generating, based on a predetermined point V of the elliptic curve and a positive R-bit integer k, a first point of the elliptic curve that is based, at least in part, on the point kV of the elliptic curve, wherein $k = \sum_{r=0}^{R-1} 2^r b_r$, and, for each r=0, 1, ..., R−1, $b_r$ is the bit value of k at bit position r of k, wherein the method comprises: storing, according to a partition of the R bit positions for k into T groups of bit positions $P_t$ (t=0, 1, ..., T−1), a corresponding lookup table $L_t$ having, for each of the $2^{|P_t|}$ possible options for assigning to the $|P_t|$ bit positions $s \in P_t$ a respective bit value $x_s$, a corresponding point of the elliptic curve that is based, at least in part, on the point $(\sum_{s \in P_t} 2^s x_s) V$ of the elliptic curve; obtaining k; and determining the first point as $\sum_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

According to a second aspect of the invention, there is provided a system arranged to perform an elliptic curve cryptographic process to generate output data based on input data, the elliptic curve cryptographic process based on an elliptic curve over a finite field, wherein the generation of the output data comprises generating, based on a predetermined point V of the elliptic curve and a positive R-bit integer k, a first point of the elliptic curve that is based, at least in part, on the point kV of the elliptic curve, wherein $k = \sum_{r=0}^{R-1} 2^r b_r$, and, for each r=0, 1, ..., R−1, $b_r$ is the bit value of k at bit position r of k, wherein the system comprises: a memory storing, according to a partition of the R bit positions for k into T groups of bit positions $P_t$ (t=0, 1, ..., T−1), a corresponding lookup table $L_t$ having, for each of the $2^{|P_t|}$ possible options for assigning to the $|P_t|$ bit positions $s \in P_t$ a respective bit value $x_s$, a corresponding point of the elliptic curve that is based, at least in part, on the point $(\sum_{s \in P_t} 2^s x_s) V$ of the elliptic curve; and one or more processors arranged to: obtain k; and determine the first point as $\sum_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

In some embodiments of the first and second aspects of the invention, the first point of the elliptic curve is the point kV, and for each lookup table $L_t$ (t=0, 1, ..., T−1) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\sum_{s \in P_t} 2^s x_s) V$ of the elliptic curve.

In some embodiments of the first and second aspects of the invention, the first point of the elliptic curve is the point $(k\mu)V$, wherein $\mu$ is a predetermined non-negative integer, wherein for each lookup table $L_t(t=0, 1, \ldots, T-1)$ and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\mu \Sigma_{s \in P_t} 2^s x_s) V$ of the elliptic curve.

In some embodiments of the first and second aspects of the invention, the first point of the elliptic curve is the point $(k+\mu)V$, wherein $\mu$ is a predetermined non-negative R-bit integer, wherein $\mu = \Sigma_{r=0}^{R-1} 2^r \hat{b}_r$ and, for each $r=0, 1, \ldots, R-1$, $\hat{b}_r$ is the bit value of $\mu$ at bit position $r$ of $\mu$, wherein for each lookup table $L_t(t=0, 1, \ldots, T-1)$ and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + (\Sigma_{s \in P_t} 2^s \hat{b}_s)V$ of the elliptic curve.

In some embodiments of the first and second aspects of the invention, the first point of the elliptic curve is the point $k(V+M)$, wherein M is a predetermined point of the elliptic curve, wherein for each lookup table $L_t(t=0, 1, \ldots, T-1)$ and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + (\Sigma_{s \in P_t} 2^s x_s)M$ of the elliptic curve.

In some embodiments of the first and second aspects of the invention, the first point of the elliptic curve is the point $kV+M$, wherein M is a predetermined point of the elliptic curve, wherein for each lookup table $L_t(t=0, 1, \ldots, T-1)$ and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + M$ of the elliptic curve.

In some embodiments of the first and second aspects of the invention, wherein the first point of the elliptic curve is the point $k\mu V + M$, wherein M is a predetermined point of the elliptic curve and $\mu$ is a predetermined non-negative integer, wherein for each lookup table $L_t(t=0, 1, \ldots, T-1)$ and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\mu \Sigma_{s \in P_t} 2^s x_s)V + M$ of the elliptic curve.

In the above embodiments of the first and second aspects of the invention, $\mu$ and/or M may be a secret maintained by a third party.

In some embodiments of the first and second aspects of the invention, all of the T groups of bit positions $P_t(t=0, 1, \ldots, T-1)$ have the same number of bit positions. In some such cases, all of the T groups of bit positions $P_t(t=0, 1, \ldots, T-1)$ have 4 bit positions.

In some embodiments of the first and second aspects of the invention, for each of the T groups of bit positions $P_t(t=0, 1, \ldots, T-1)$, the bit positions of $P_t$ are consecutive.

In some embodiments of the first and second aspects of the invention, the cryptographic process comprises one or more of: elliptic curve encryption; elliptic curve decryption; elliptic curve shared secret establishment; elliptic curve digital signature generation; elliptic curve digital signature verification.

According to a third aspect of the invention, there is provided a computer program which, when executed by one or more processors, causes the one or more processors to carry out the method of the first aspect of the invention or any embodiment thereof. This computer program may be stored on one or more storage media.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
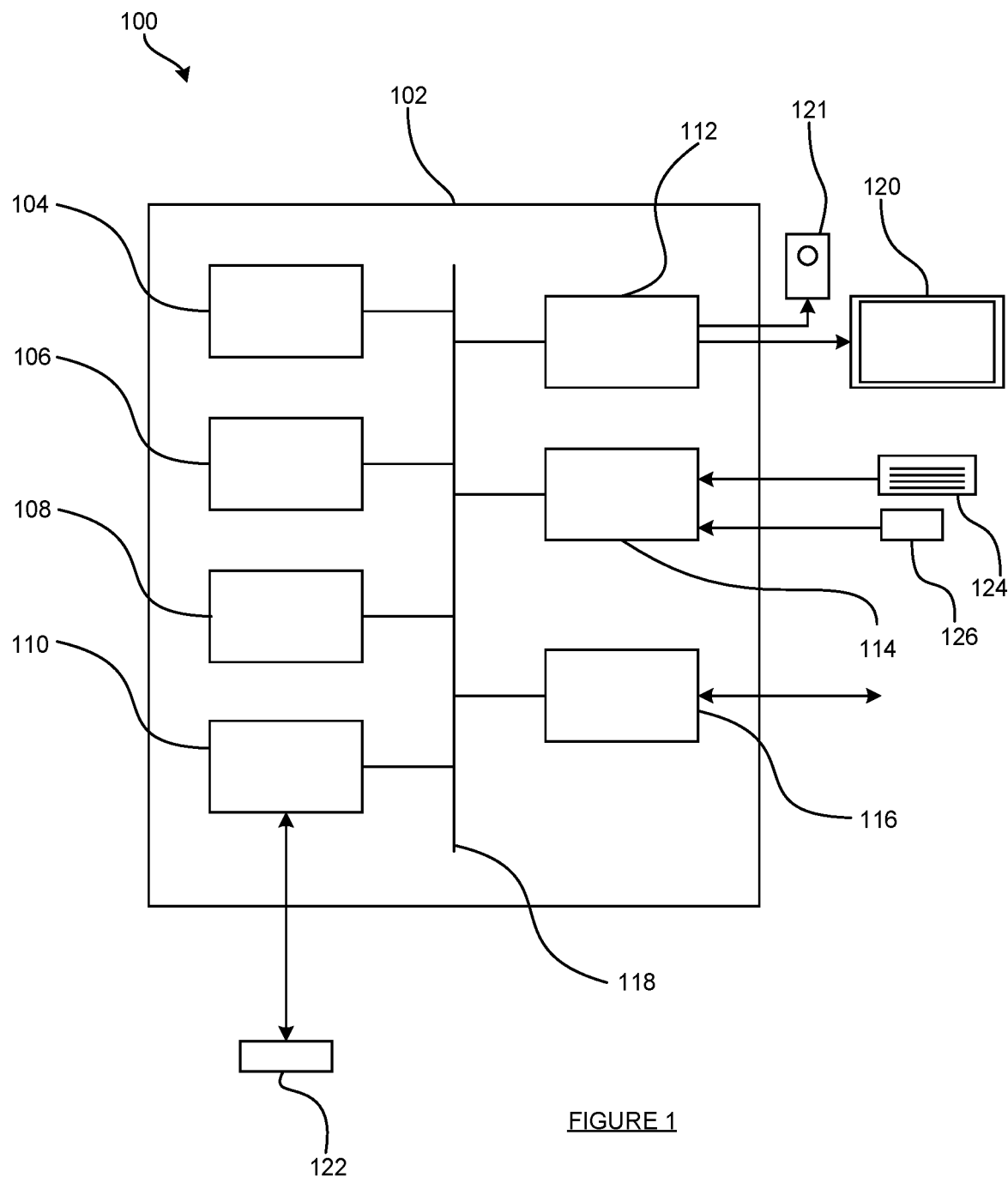
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. Additionally, it is possible that some components of the computer system 100 are not located in the computer 102 and are, instead, part of a computer network connected to the computer 102 via the network interface 116. Additionally or alternatively, the computer system 100 may comprise multiple computers 102, e.g. in a network of computers such as a cloud system of computing resources.

2—Elliptic Curve Cryptographic Processes With Masked Curve Points

Elliptic curve cryptographic processes (such as the examples set out earlier) may involve performing elliptic curve scalar multiplication, namely: given an elliptic curve point V and a non-negative integer k, calculation of the elliptic curve point kV. The point V could, for example, be the generator point G or a public key Q. When implementing the cryptographic process (e.g. as part of a software implementation), it is possible to do so in a masked way. The masking could take a variety of forms, e.g. (a) using the point $\hat{V}=\mu V$ instead of the point V for some positive integer $\mu$ (which may be kept secret) to thereby calculate $k\hat{V}=k\mu V$; (b) calculating the point $\hat{V}=(k+\mu)V$ instead of the point kV for some positive integer $\mu$ (which may be kept secret); (c) calculating the point $\hat{V}=kV+M$ or $\hat{V}=k(V+M)$ instead of the point kV for some elliptic curve point $M \neq \mathcal{O}$; (d) some combination of the above; etc.

Example 1—Continued: Elliptic Curve Shared Secret Establishment

Continuing the example of elliptic curve shared secret establishment set out earlier, this may be implemented/adapted in a variety of ways, as set out below:

Implementation using the point $\hat{V}=\mu V$ instead of the point V for some positive integer $\mu$ Alice's implementation uses an obfuscated version of $d_A$, namely $\hat{d}_A$, instead of $d_A$, where $d_A = \mu \hat{d}_A$. Here, $\mu$ is a positive integer kept secret by a third party (e.g. the third party may have been involved in the initial generation of the private key $d_A$, and may have generated (and kept secret) the value $\mu$ and may have provided $\hat{d}_A$ and not $d_A$ to Alice). Thus, Alice's implementation is more secure, as it does not store or reveal the actual private key $d_A$.

When Bob wants to send his public key $Q_B$ to Alice, Bob passes $Q_B$ to the third party, and the third party provides (or identifies) an obfuscated version of $Q_B$, namely the point $\hat{Q}_B = \mu Q_B$, to Alice, or the third party enables Alice to implement the function $f(x) = x\mu Q_B$ (e.g. by providing code to implement this function or, as set out in more detail later, by providing a suitable set of lookup tables).

Alice can then calculate $\hat{d}_A \hat{Q}_B = \hat{d}_A \mu Q_B = f(\hat{d}_A) = d_A Q_B$.

Bob can calculate $d_B Q_A$ to yield the same result (i.e. $d_A Q_B$) as Alice. This could be based directly on $d_B$ and $Q_A$ or, in an analogous way as for Alice, using an obfuscated version of $d_B$ (which may be based on a different value for $\mu$) and a correspondingly obfuscated version of $Q_A$.

Implementation using calculation of the point $\hat{V}=(k+\mu)V$ instead of the point kV for some positive integer $\mu$ Alice's implementation uses an obfuscated version of $d_A$, namely $\hat{d}_A$, instead of $d_A$, where $d_A = \mu + \hat{d}_A$. Here, $\mu$ is a positive integer kept secret by a third party (e.g. the third party may have been involved in the initial generation of the private key $d_A$, and may have generated (and kept secret) the value $\mu$ and may have provided $\hat{d}_A$ and not $d_A$ to Alice). Thus, Alice's implementation is more secure, as it does not store or reveal the actual private key $d_A$.

When Bob wants to send his public key $Q_B$ to Alice, Bob passes $Q_B$ to the third party, and the third party enables Alice to implement the function $f(x)=(x+\mu)Q_B$ (e.g. by providing code to implement this function or, as set out in more detail later, by providing a suitable set of lookup tables).

Alice can then calculate $f(\hat{d}_A) = (\hat{d}_A + \mu) Q_B = d_A Q_B$.

Bob can calculate $d_B Q_A$ to yield the same result (i.e. $d_A Q_B$) as Alice. This could be based directly on $d_B$ and $Q_A$ or, in an analogous way as for Alice, using an obfuscated version of $d_B$ (which may be based on a different value for $\mu$) and a correspondingly obfuscated version of $Q_A$.

Implementation using calculation of the point $\hat{V}=kV+M$ instead of the point kV for some elliptic curve point $M \neq \mathcal{O}$ Alice's implementation uses an obfuscated version of $d_A$, namely $\hat{d}_A$, instead of $d_A$, where $d_A = \mu \hat{d}_A$. Here, $\mu$ is a positive integer kept secret by a third party (e.g. the third party may have been involved in the initial generation of the private key $d_A$, and may have generated (and kept secret) the value $\mu$ and may have provided $\hat{d}_A$ and not $d_A$ to Alice). Thus, Alice's implementation is more secure, as it does not store or reveal the actual private key $d_A$.

When Bob wants to send his public key $Q_B$ to Alice, Bob passes $Q_B$ to the third party, and the third party enables Alice to implement the function $f(x)=x\mu Q_B+M$ (e.g. by providing code to implement this function or, as set out in more detail later, by providing a suitable set of lookup tables).

Alice can then calculate $f(\hat{d}_A)=\hat{d}_A\mu Q_B+M=d_AQ_B+M$.

Bob can calculate $d_BQ_A+M$ to yield the same result (i.e. $d_AQ_B+M$) as Alice. This could be based directly on $d_B$ and $Q_A$ or, in an analogous way as for Alice, using an obfuscated version of $d_B$ (which may be based on a different value for $\mu$) and a correspondingly obfuscated version of $Q_A$.

Example 2—Continued: Elliptic Curve Encryption And Decryption

Continuing the example of elliptic curve encryption and decryption set out earlier, this may be implemented/adapted in a variety of ways, as set out below:

Implementation using the point $\hat{V}=\mu V$ instead of the point V for some positive integer $\mu$ Bob's implementation uses an obfuscated version of $d_B$, namely $\hat{d}_B$, instead of $d_B$, where $d_B=\mu\hat{d}_B$. Here, $\mu$ is a positive integer kept secret by a third party (e.g. the third party may have been involved in the initial generation of the private key $d_B$, and may have generated (and kept secret) the value $\mu$ and may have provided $\hat{d}_B$ and not $d_B$ to Bob). Thus, Bob's implementation is more secure, as it does not store or reveal the actual private key $d_B$.

When Bob wants to send his public key $Q_B$ to Alice, Bob passes $Q_B$ to the third party, and the third party provides (or identifies) $Q_B$ to Alice along with an obfuscated version of G, namely the point $\hat{G}=\mu G$, to Alice, or the third party enables Alice to implement the function $f(x)=x\mu G$ (e.g. by providing code to implement this function or, as set out in more detail later, by providing a suitable set of lookup tables). Alternatively, the third party may already have provided (or identified) Bob with $\hat{G}$ (or the code or tables for the function $f$), so that Bob can provide these directly to Alice instead of using the third party for this provision to Alice.

Encryption step (1) then becomes Alice generating a random integer $r\in[1,n-1]$ and calculating $\hat{W}=r\hat{G}=f(r)=r\mu G$. Alice sends $\hat{W}$ to Bob instead of W at encryption step (5).

Decryption step (1) then becomes Bob generating $s=p_x$ where $P=(p_x, p_y)=\hat{d}_B\hat{W}$ (noting that $\hat{d}_B\hat{W}=\hat{d}_Br\mu G=d_BrG=rQ_B$ as desired).

Implementation using the point $V=\mu V$ instead of the point V for some positive integer $\mu$ Bob's implementation uses an obfuscated version of $d_B$, namely $\hat{d}_B$, instead of $d_B$, where $\hat{d}_B=\mu d_B$. Here, $\mu$ is a positive integer kept secret by a third party (e.g. the third party may have been involved in the initial generation of the private key $d_B$, and may have generated (and kept secret) the value $\mu$ and may have provided $\hat{d}_B$ and not $d_B$ to Bob). Thus, Bob's implementation is more secure, as it does not store or reveal the actual private key $d_B$.

When Bob wants to send his public key $Q_B$ to Alice, Bob passes $Q_B$ to the third party, and the third party provides (or identifies) an obfuscated version of $Q_B$, namely the point $\hat{Q}_B=\mu Q_B$, to Alice, or the third party enables Alice to implement the function $f(x)=x\mu Q_B$ (e.g. by providing code to implement this function or, as set out in more detail later, by providing a suitable set of lookup tables). Alternatively, the third party may already have provided (or identified) Bob with $\hat{Q}_B$ (or the code or tables for the function $f$), so that Bob can provide these directly to Alice instead of using the third party for this provision to Alice.

Encryption step (2) then involves Alice generating $\hat{P}=r\hat{Q}_B=f(r)$, with $\hat{P}$ being used subsequently instead of P.

Decryption step (1) then becomes Bob generating $s=p_x$ where $P=(p_x, p_y)=\hat{d}_BW$ (noting that $\hat{d}_BW=\mu d_BrG=r\mu Q_B=r\hat{Q}_B=f(r)=\hat{P}$ as desired).

Of course, this could be combined with the previous masked implementation of elliptic curve encryption and decryption.

Example 3—Continued: Elliptic Curve Digital Signatures

Continuing the example of elliptic curve digital signatures set out earlier, this may be implemented/adapted in a variety of ways, as set out below:

Implementation using the point $\hat{V}=\mu V$ instead of the point V for some positive integer $\mu$ Alice's implementation uses an obfuscated version of $d_A$, namely $\hat{d}_A$, instead of $d_A$, where $\hat{d}_A=\mu d_A$. Here, $\mu$ is a positive integer kept secret by a third party (e.g. the third party may have been involved in the initial generation of the private key $d_A$, and may have generated (and kept secret) the value $\mu$ and may have provided $\hat{d}_A$ and not $d_A$ to Alice). Thus, Alice's implementation is more secure, as it does not store or reveal the actual private key $d_A$.

When Alice wants to send her public key $Q_A$ to Bob, Alice passes $Q_A$ to the third party, and the third party provides (or identifies) an obfuscated version of $Q_A$, namely the point $\hat{Q}_A=\mu Q_A$, to Bob, or the third party enables Bob to implement the function $f(x)=x\mu Q_A$ (e.g. by providing code to implement this function or, as set out in more detail later, by providing a suitable set of lookup tables). Alternatively, the third party may already have provided (or identified) Alice with $\hat{Q}_A$ (or the code or tables for the function $f$), so that Alice can provide these directly to Bob instead of using the third party for this provision to Bob.

Signature step (6) then becomes

Calculate $s=k^{-1}(z+r\hat{d}_A) \bmod n$. If $s=0$ then return to (3).

Verification step (1) then becomes checking the validity of $\hat{Q}_A$.

Verification step (5) then becomes

Calculate the point of the elliptic curve $(x_1, y_1)=u_1G+u_2\hat{Q}_A$.

Here, we note that:

$$u_1G + u_2\hat{Q}_A = u_1G + u_2\mu Q_A$$
$$= u_1G + u_2\mu d_AG$$

-continued $$= u_1 G + u_2 \hat{d}_A G$$

$$= (zs^{-1} + rs^{-1}\hat{d}_A)G$$

$$= (z + r\hat{d}_A)s^{-1}G$$

$$= (z + r\hat{d}_A)(k^{-1}(z + r\hat{d}_A))^{-1}G$$

$$= kG$$

$$= (x_1, y_1)$$

as desired.

3—Secured Elliptic Curve Multiplication

Set out below is a method for performing secured elliptic curve scalar multiplication, namely: given an elliptic curve point V and a non-negative integer k, secured calculation of the elliptic curve point kV. The elliptic curve point V could, for example, be the generator point G that forms part of the domain parameters for the elliptic curve cryptographic process, but this is merely one example for the elliptic curve point V.

The integer k has (or may be represented by) R bits. Thus, there are R bit positions in the binary representation of k. In the following, the bit positions shall be positions 0, 1, ..., R−1, where bit position 0 is the position of the least significant bit and bit position R−1 is the position of the most significant bit. It will, however, be appreciated that this is not essential and that the equations/formulae set out below could be adapted to other bit position numbering accordingly. The values of k's bits are $b_r$ (r=0, 1, ..., R−1) where $b_r$=0 or 1 and $b_r$ is the value for bit position r, so that $k = \sum_{r=0}^{R-1} 2^r b_r$.

These R bit positions for k may be partitioned (or split or divided) into T groups (or sets) of bit positions $P_t$ (t=0, 1, ..., T−1), for an integer T>1. Each group $P_t$ (t=0, 1, ..., T−1) has $|P_t|$ bit positions respectively, namely $p_{t,s}$ (s=0, 1, ..., $|P_t|$−1), i.e. $P_t = \{p_{t,0}, p_{t,1}, \ldots, p_{t,|P_t|-1}\}$. The T groups of bit positions $P_t$ (t=0, 1, ..., T−1) are non-overlapping groups of bit positions that, together, span the full set of R bit positions for k, i.e. $P_{t_1} \cap P_{t_2} = \emptyset$ if $t_1 \neq t_2$, and $\cap_{t=0,\ldots,T-1} P_t = \{0, 1, \ldots, R-1\}$. Thus $\sum_{t=0}^{T-1} |P_t| = R$.

Notably, $k = \sum_{r=0}^{R-1} 2^r b_r = \sum_{t=0}^{T-1} \sum_{s \in P_t} 2^s b_s$ so that $kV = (\sum_{r=0}^{R-1} 2^w b_w) V = (\sum_{t=0}^{T-1} \sum_{s \in P_t} 2^s b_s) V = \sum_{t=0}^{T-1} ((\sum_{s \in P_t} 2^s b_s) V)$.

Now, as each group $P_t$ (t=0, 1, ..., T−1) has $|P_t|$ bit positions, there are $2^{|P_t|}$ possible options for assigning a respective bit value $x_s$ (where $x_s$=0 or 1) to the $|P_t|$ bit positions $p_s \in P_t$. Defining $Y(V, \{x_s: s \in P_t\}) = (\sum_{s \in P_t} 2^s x_s) V$, then for each group $P_t$ (t=0, 1, ..., T−1), a corresponding lookup table $L_t$ may be constructed, where $L_t$ has, for each of the $2^{|P_t|}$ possible options for assigning to the $|P_t|$ bit positions $s \in P_t$ a respective bit value $x_s$, the corresponding elliptic curve point $Y(V, \{x_s: s \in P_t\})$. For example, if $P_t = \{4, 5, 10\}$, then $Y(V, \{x_4, x_5, x_{10}\}) = (2^4 x_4 + 2^5 x_5 + 2^{10} x_{10})V$, and there are 8 points $Y(V, \{x_4, x_5, x_{10}\})$ stored in the lookup table $L_t$ corresponding to the 8 possible options for assigning bit values to the triple of bits $x_4, x_5, x_{10}$.

Hence, given any particular option for assigning to the $|P_t|$ bit positions $p_s \in P_t$ respective bit value $x_s$ (where $x_s$=0 or 1), the lookup table $L_t$ may be used to lookup (or obtain or identify) the corresponding elliptic curve point $Y(V, \{x_s: s \in P_t\})$. For example, the lookup table $L_t$ may be indexed so that, for an input represented by a value with $|P_t|$-bit binary representation $$x_{p_{t,|P_t|-1}} x_{p_{t,|P_t|-2}} \ldots x_{p_{t,1}} x_{p_{t,0}},$$

the lookup table $L_t$ maps that input value to the elliptic curve point $Y(V, \{x_s: s \in P_t\})$. Alternatively, the lookup table $L_t$ may be indexed so that, for an input value of $E_{s \in P_t} 2^s x_s$, the lookup table $L_t$ maps that input value to the elliptic curve point $Y(V, \{x_s: s \in P_t\})$. It will be appreciated that the lookup table $L_t$ may be indexed or configured in other ways too.

Based on the above, the elliptic curve point kV may then be determined as $kV = \sum_{t=0}^{T-1} Y(V, \{b_s: s \in P_t\})$, i.e. as $\sum_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

For example, suppose R=256, T=64 and, for t=0, 1, ..., 63, $P_t = \{4t+3, 4t+2, 4t+1, 4t\}$, i.e. for t=0, 1, ..., 63 and s=0,1,2,3, $p_{t,s}$=4t+s. In this example, k's binary representation may be viewed as a concatenation of 64 4-bit blocks, each of those blocks representing a 4-bit value $k_t \in \{0, 1, 2, \ldots, 15\}$ (for t=0, 1, ..., 63), so that $k = k_{63} 2^{252} + k_{62} 2^{248} + \ldots + k_1 2^4 + k_0 2^0$. The lookup table $L_t$ (t=0, 1, ..., 63) may then be generated (or configured) to map the 16 possible values for $k_t$ to the respective points $2^{4t} k_t V$. Then $kV = \sum_{t=0}^{T-1} l_t$, where $l_t$ is the point of the elliptic curve that corresponds, in lookup table $L_t$, to $k_t$, i.e. the option for assigning to the $|P_t|$ bit positions $s \in P_t$ the corresponding bit value $b_s$.

It will be appreciated that, whilst the above example partitions the bit positions into equal size groups of bit positions (i.e. each group having 4 bit positions), that this is not necessary. Some embodiments may impose a minimum and/or a maximum size to each group of bit positions.

Likewise, it will be appreciated that, whilst the above example partitions the bit positions into groups of consecutive bit positions, that this is also not necessary, i.e. the bit positions in a group need not be consecutive.

In some embodiments, the partition may be randomly determined when the lookup tables $L_t$ (t=0, 1, ..., T−1) are generated (subject, potentially, to minimum and/or maximum thresholds for the size of each partition $P_t$).

In some embodiments, there may be a minimum threshold for the number T of groups of bit positions, with the groups (and possibly the sizes of the groups) being determined accordingly so as to meet (at least) this minimum threshold for the number T.

As discussed in section 2 above, in some embodiments, it may be desirable to actually calculate the point (kμ)V for some predetermined non-negative integer μ which is to remain a secret. In this case, $Y(V, \{x_s: s \in P_t\})$ may be defined differently as $Y(V, \{x_s: s \in P_t\}) = (\mu \sum_{s \in P_t} 2^s x_s) V$. The lookup tables $L_t$ (t=0, 1, ..., T−1) may then be generated according to this alternative definition of $Y(V, \{x_s: s \in P_t\})$.

As discussed in section 2 above, in some embodiments, it may be desirable to actually calculate the point (k+μ)V for some predetermined non-negative R-bit integer μ which is to remain a secret. The values of μ's bits are $\acute{b}_r$ (r=0, 1, ..., R−1) where $\acute{b}_r$=0 or 1 and $\acute{b}_r$ is the value for bit position r, so that $\mu = \sum_{r=0}^{R-1} 2^r \acute{b}_r$. In this case, $Y(V, \{x_s: s \in P_t\})$ may be defined differently as $Y(V, \{x_s: s \in P_t\}) = (\sum_{s \in P_t} 2^s x_s) V + (\sum_{s \in P_t} 2 \acute{b}_s) V$. The lookup tables $L_t$ (t=0, 1, ..., T−1) may then be generated according to this alternative definition of $Y(V, \{x_s: s \in P_t\})$.

As discussed in section 2 above, in some embodiments, it may be desirable to actually calculate the point k(V+M) for some predetermined elliptic curve point M which is to remain a secret. In this case, $Y(V, \{x_s: s \in P_t\})$ may be defined differently as $Y(V, \{x_s: s \in P_t\}) = (\sum_{s \in P_t} 2^s x_s) V + (\sum_{s \in P_t} 2^s x_s) M$. The lookup tables $L_t$ (t=0, 1, ..., T−1) may then be generated according to this alternative definition of $Y(V, \{x_s: s \in P_t\})$.

As discussed in section 2 above, in some embodiments, it may be desirable to actually calculate the point $k\mu V+M$ for some predetermined elliptic curve point M and some predetermined non-negative integer $\mu$ which are to remain secret. In this case, $Y(V, \{x_s: s\in P_t\})$ may be defined differently as $Y(V, \{x_s: s\in P_t\})=(\mu \Sigma_{s\in P_t} 2^s s_s)V+M$. The lookup tables $L_t$ (t=0, 1, ..., T−1) may then be generated according to this alternative definition of $Y(V, \{x_s: s\in P_t\})$.

Figure 2:
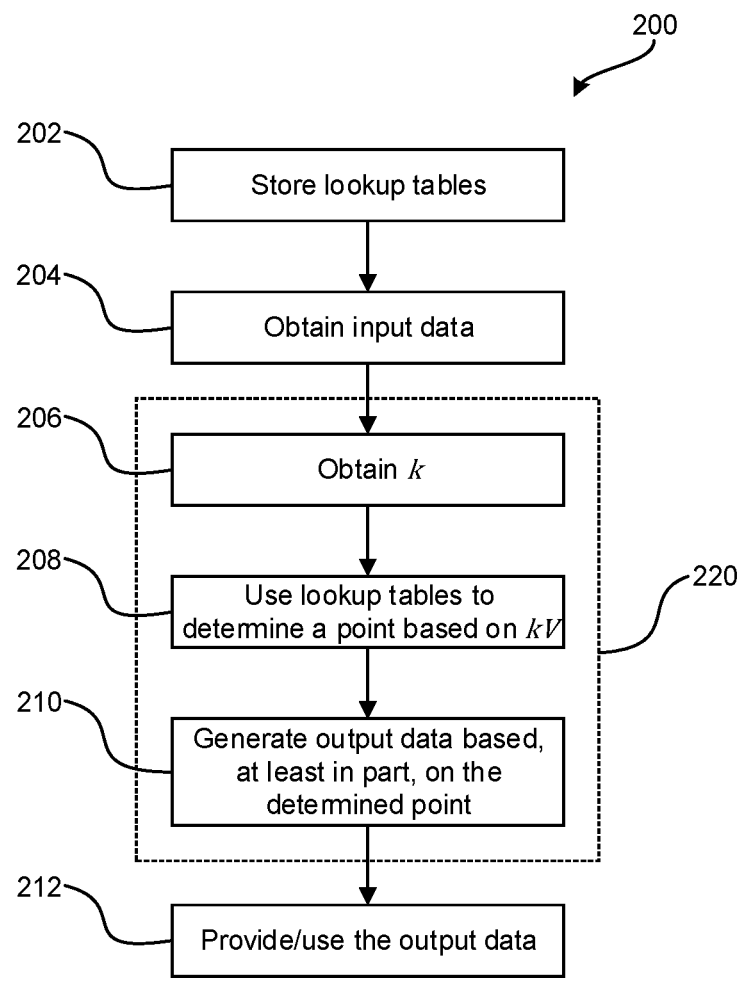
FIG. 2 is flow diagram illustrating a method for performing an elliptic curve cryptographic process.

Based on the above, FIG. 2 is flow diagram illustrating a method 200 for performing an elliptic curve cryptographic process 220. The method 200 may be performed, for example, by the computer system 100 of FIG. 1 (e.g. by execution of a computer program by the processor 108). The elliptic curve cryptographic process 220 may, for example, be any of the above-discussed elliptic curve cryptographic processes, such as shared secret establishment, encryption, decryption, digital signature generation and digital signature verification, although it will be appreciated that the elliptic curve cryptographic process 220 could be any other the elliptic curve cryptographic process and/or may be a different algorithm/protocol than the specific examples set out above for shared secret establishment, encryption, decryption, digital signature generation and digital signature verification.

In general, the elliptic curve cryptographic process 220 generates output data based on input data. The elliptic curve cryptographic process 220 is based on an elliptic curve over a finite field (as has been discussed above). The generation of the output data comprises (amongst other operations/calculations) generating, based on a predetermined point V of the elliptic curve and a positive R-bit integer k, a first point of the elliptic curve that is based, at least in part, on the point kV of the elliptic curve. In some embodiments, the first point may be the point kV. In other embodiments, the first point may be related to, or based on, the point kV, such as: the point $(k\mu)V$ for some predetermined non-negative integer $\mu$; the point $(k+\mu)V$ for some predetermined non-negative R-bit integer $\mu$; the point $k(V+M)$ for some predetermined elliptic curve point M; the point $k\mu V+M$ for some predetermined elliptic curve point M; some combination of two or more of these; etc.

For example:
(a) If the elliptic curve cryptographic process 220 is the example of shared secret establishment discussed above (i.e. Example 1), as performed by Alice, then (i) the input data may comprise Bob's public key $Q_B$; (ii) the output data may comprise $p_x$, where $(p_x, p_y)=d_A Q_B$; and (iii) generation of the output data involves using/determining the point $d_A Q_B$ based on the point $Q_B$ and the positive integer $d_A$.
(b) If the elliptic curve cryptographic process 220 is the example of encryption discussed above (i.e. Example 2), as performed by Alice, then (i) the input data may comprise the message m and Bob's public key $Q_B$; (ii) the output data may comprise the point W and the encrypted message $c=E(m, k_E)$; and (iii) generation of the output data involves using/determining the point $W=rG$ based on the point G and the positive integer r and/or using/determining the point $P=r Q_B$ based on the point $Q_B$ and the positive integer r.
(c) If the elliptic curve cryptographic process 220 is the example of digital signature generation discussed above (i.e. Example 3), as performed by Alice, then (i) the input data may comprise the message m; (ii) the output data may comprise the signature (r, s); and (iii) generation of the output data involves using/determining the point kG based on the point G and the positive integer k.
(d) If the elliptic curve cryptographic process 220 is the example of digital signature verification discussed above (i.e. Example 3), as performed by Bob, then (i) the input data may comprise the signature (r, s), the message m, and Alice's public key $Q_A$; (ii) the output data may comprise an indication of whether or not the signature (r, s) is valid, i.e. whether the signature (r, s) corresponds to the message m and Alice's public key $Q_A$; and (iii) generation of the output data involves using/determining the point $nQ_A$ based on the point $Q_A$ and the positive integer n and/or using/determining the point $u_1 G$ based on the point G and the positive integer $u_1$ and/or using/determining the point $u_2 Q_A$ based on the point $Q_A$ and the positive integer $u_2$.

The above applies likewise to the modified versions of these cryptographic processes that use masked curved points and/or masked private keys, as has been discussed above.

At a step 202, the method 200 comprises storing, based on (or according to) the partition of the R bit positions for k into the T groups of bit positions $P_t$ (t=0, 1, ..., T−1) having $|P_t|$ bit positions respectively (namely $p_{t,s}$ (s=0, 1, ..., $|P_t|$−1) for each group $P_t$ (t=0, 1, ..., T−1)), the corresponding lookup table $L_t$. As discussed above $L_t$ has, for each of the $2^{|P_t|}$ possible options for assigning respective bit value $x_s$ to the $|P_t|$ bit positions $p_{t,s}$ of $P_t$=0, 1, ..., $|P_t|$−1 and $x_s$=0 or 1) the corresponding point of the elliptic curve $(\Sigma_{s\in P_t} 2^s x_s)V$.

In some embodiments, the step 202 involves the computer system 100 generating the lookup tables $L_t$ (t=0, 1, ..., T−1) and then storing those generated tables. For example, if the point V is to be the generator point G for the elliptic curve (as for examples (b), (c) and (d) above), then the computer system 100 may generate the lookup tables $L_t$ (t=0, 1, ..., T−1) once the computer system 100 knows which elliptic curve and generator 0 point G to use (e.g. as established by the domain parameters). As another example, if the point V is to be the public key $Q_A$ for Alice or $Q_B$ for Bob (as for examples (a), (b) and (e) above), then the computer system 100 may generate the lookup tables $L_t$ (t=0, 1, ..., T−1) once the computer system 100 knows which elliptic curve to use (e.g. as established by the domain parameters) as well as that public key. As mentioned, the generation of the lookup tables $L_t$ (t=0, 1, ..., T−1) may also comprise determining the partition to use for the R bit positions for k (e.g. as a randomly generated partition); alternatively, the partition may be predetermined.

In other embodiments, the step 202 may involve the computer system 100 receiving the lookup tables $L_t$ (t=0, 1, ..., T−1) and then storing those received lookup tables. For example, Alice or Bob may generate the lookup tables based on the point V being their respective public key $Q_A$ or $Q_B$ and then provide the generated lookup tables to the computer system 100 so that the computer system 100 can use those tables (and therefore the public key) as part of the cryptographic process. In some embodiments, the generation of the lookup tables $L_t$ (t=0, 1, ..., T−1) may be performed by a third party, different from the entity (or entities) involved in, or ultimately performing, some or all of the cryptographic process—e.g. as in the modified versions of the cryptographic processes that use masked curved points and/or masked private keys, as has been discussed above.

It will be appreciated that other mechanisms for generating and/or storing the lookup tables $L_t$ (t=0, 1, ..., T−1) could be used.

At a step 204, the method 200 comprises obtaining the input data for the elliptic curve cryptographic process 220. Given the variety of elliptic curve cryptographic processes 220 (e.g. the examples (a)-(e) set out above), it will be appreciated the input data may be obtained in a variety of ways and may be intended for a variety of purposes.

At a step 206, the method 200 comprises obtaining (or calculating or generating) the positive integer k. As discussed above, the R bits of k have respective values $b_r$ (r=0, 1, ..., R−1) so that $k=\Sigma_{r=0}^{R-1} 2^r b_r$. Given the variety of elliptic curve cryptographic processes 220 (e.g. the examples (a)-(d) set out above), it will be appreciated k may be obtained in a variety of ways and may be intended for a variety of purposes.

At a step 208, the method 200 comprises using the lookup tables $L_t$ (t=0, 1, ..., T−1) as has been described above to generate the first point (e.g. kV in some embodiments) as $\Sigma_{t=0}^{T-1} l_t$, where $l_t$ is the point of the elliptic curve that corresponds, in lookup table $L_t$, to the option for assigning bit value $b_{p_{t,s}}$ to bit position $p_{t,s}$ (for each s=0, 1, ..., |$P_t$|−1), i.e. where $l_t$ is the point of the elliptic curve that corresponds, in lookup table $L_t$, to the option for assigning to the |$P_t$| bit positions s∈$P_t$ the corresponding bit value $b_s$.

At a step 210, the method 200 comprises using the generated first point to generate the output data for the elliptic curve cryptographic processes 220. Given the variety of elliptic curve cryptographic processes 220 (e.g. the examples (a)-(e) set out above), it will be appreciated the output data may be generated in a variety of ways.

Finally, at a step 212, the method 202 may comprise using and/or providing the generate output data, depending on the intended purpose of the output data, e.g. Alice and Bob using their shared secret to establish a shared secret key in example (a) above; Alice providing the point W and the encrypted message $c=E(m,k_E)$ to Bob in example (b) above; Alice providing the signature (r,s) to Bob in example (c) above; and Bob determining whether or not to trust the signed message based on the verification result in example (d) above.

Use of the above-described method to perform elliptic curve scalar multiplication via lookup tables provides several technical advantages, including:

Generating the first point (e.g. kV in some embodiments) as $\Sigma_{t=0}^{T-1} l_t$ involves performing T lookups (one from each lookup table $L_t$ (t=0, 1, ..., T−1)) and T−1 elliptic curve point additions using those looked-up points. This means that performance of elliptic curve scalar multiplication via lookup tables (which forms the basis of many white-box implementations of cryptographic processes) can be achieved in a memory efficient manner, especially when the field F is a large field (e.g. $GF(2^{256})$ or larger). For example, if F is $GF(2^{256})$ and if one were to use the previous example in which R=256, T=64 and, for t=0, 1, ..., 63, $P_t$={4t+3,4t+2, 4t+1,4t}, then each lookup table has 16 lookup values/points, each of which is a pair (x,y) where x, y∈GF($2^{256}$), so that each lookup value/point can be represented by 512 bits. Thus, each lookup table may use 16×512=8,192 bits, so that in total, the set of T lookup tables ($L_t$ (t=0, 1, ..., T−1)) may use just 64×8,192=524,288 bits, i.e. 64 KB.

As generating the first point (e.g. kV in some embodiments) as $\Sigma_{t=0}^{T-1} l_t$ involves performing T lookups (one from each lookup table $L_t$ (t=0, 1, ..., T−1)) and T−1 elliptic curve point additions using those looked-up points, regardless of the value of k, the elliptic curve scalar multiplication can be performed both quickly and in substantially constant time (independent of k), thereby making timing attacks more difficult for attackers.

Use of the lookup tables $L_t$ (t=0, 1, ..., T−1)) inherently hides/embeds the underlying elliptic curve point V so that it is difficult for an attacker to identify the underlying elliptic curve point V. Even if security of the cryptographic process itself does not rely on secrecy of the underlying elliptic curve point V (e.g. if the point V is the generator point G or a public key), use of the lookup tables to implement the underlying elliptic curve point V helps add an extra later of security that makes it more difficult for an attacker. For example, Alice and Bob may need to undertake shared secret establishment, with Alice being in charge of the process—Alice could send Bob a set of lookup tables so as to perform elliptic curve scalar multiplication based on underlying point G (so that Bob can generate a private and public key pair without knowing the point G) and/or a set of lookup tables so as to perform elliptic curve scalar multiplication based on underlying point $Q_A$ (so that Bob can use Alice's public key $Q_A$ without knowing the point $Q_A$).

Moreover, as discussed above, use of the lookup tables $L_t$ (t=0, 1, ..., T−1)) can be used to hide/embed/use further secret data, e.g. calculating the point (kμ)V for some predetermined non-negative integer μ which is to remain a secret; calculating the point (k+μ)V for some predetermined non-negative R-bit integer μ which is to remain a secret; calculating the point kV+M or k(V+M) or kμV+M for some predetermined elliptic curve point M and predetermined non-negative integer μ which is/are to remain a secret. In this way, further security may be achieved for the implementation of the elliptic curve cryptographic process, since the attacker is not able to leverage the data available in the absence of knowledge of the secret data. Additionally, as discussed above, this enables implementations that do not store an entity's actual private key but, instead, store or use an obfuscated version of the private key.

4—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (CPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for performing an elliptic curve cryptographic process to generate output data based on input data, the elliptic curve cryptographic process based on an elliptic curve over a finite field, wherein the generation of the output data comprises generating, based on a predetermined point V of the elliptic curve and a positive R-bit integer k, a first point of the elliptic curve that is based, at least in part, on the point kV of the elliptic curve, wherein $k=\Sigma_{r=0}^{R-1} 2^r b_r$ and, for each $r=0, 1, \ldots, R-1$, $b_r$ is the bit value of k at bit position r of k, wherein the method comprises:

storing, according to a partition of the R bit positions for k into T groups of bit positions $P_t$ ($t=0, 1, \ldots, T-1$), a corresponding lookup table $L_t$ having, for each of the $2^{|P_t|}$ possible options for assigning to the $|P_t|$ bit positions $s \in P_t$ a respective bit value $x_s$, a corresponding point of the elliptic curve that is based, at least in part, on the point $(\Sigma_{s \in P_t} 2^s x_s)V$ of the elliptic curve;

obtaining k; and determining the first point as $\Sigma_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

2. The method of claim 1, wherein the first point of the elliptic curve is the point kV and wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V$ of the elliptic curve.

3. The method of claim 1, wherein the first point of the elliptic curve is the point $(k\mu)V$, wherein $\mu$ is a predetermined non-negative integer, wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\mu \Sigma_{s \in P_t} 2^s x_s)V$ of the elliptic curve.

4. The method of claim 3, wherein $\mu$ is a secret maintained by a third party.

5. The method of claim 1, wherein the first point of the elliptic curve is the point $(k+\mu)V$, wherein u is a predetermined non-negative R-bit integer, wherein $\mu=\Sigma_{r=0}^{R-1} 2^r \hat{b}_r$ and, for each $r=0, 1, \ldots, R-1$, $\hat{b}_r$ is the bit value of $\mu$ at bit position r of $\mu$, wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + (\Sigma_{s \in P_t} 2^s \hat{b}_s)V$ of the elliptic curve.

6. The method of claim 5, wherein $\mu$ is a secret maintained by a third party.

7. The method of claim 1, wherein the first point of the elliptic curve is the point $k(V+M)$, wherein M is a predetermined point of the elliptic curve, wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + (\Sigma_{s \in P_t} 2^s x_s)M$ of the elliptic curve.

8. The method of claim 7, wherein M is a secret maintained by a third party.

9. The method of claim 1, wherein the first point of the elliptic curve is the point kV+M, wherein M is a predetermined point of the elliptic curve, wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\Sigma_{s \in P_t} 2^s x_s)V + M$ of the elliptic curve.

10. The method of claim 9, wherein M is a secret maintained by a third party.

11. The method of claim 1, wherein the first point of the elliptic curve is the point $k\mu V+M$, wherein M is a predetermined point of the elliptic curve and $\mu$ is a predetermined non-negative integer, wherein for each lookup table $L_t$ ($t=0, 1, \ldots, T-1$) and for each of the $2^{|P_t|}$ possible options for assigning to the $|P_t|$ bit positions $s \in P_t$ a respective bit value $x_s$, the corresponding point of the elliptic curve stored in the lookup table $L_t$ is the point $(\mu \Sigma_{s \in P_t} 2^s x_s)V + M$ of the elliptic curve.

12. The method of claim 11, wherein at least one of M and u is a secret maintained by a third party.

13. The method of claim 1, wherein all of the T groups of bit positions $P_t$ ($t=0, 1, \ldots, T-1$) have the same number of bit positions.

14. The method of claim 13, wherein all of the T groups of bit positions $P_t$ ($t=0, 1, \ldots, T-1$) have 4 bit positions.

15. The method of claim 1, wherein, for each of the T groups of bit positions $P_t$ ($t=0, 1, \ldots, T-1$), the bit positions of $P_t$ are consecutive.

16. The method of claim 1, wherein the cryptographic process comprises one or more of: elliptic curve encryption; elliptic curve decryption; elliptic curve shared secret establishment; elliptic curve digital signature generation; elliptic curve digital signature verification.

17. A system comprising one or more processors, the one or more processors arranged to carry out a method for performing an elliptic curve cryptographic process to generate output data based on input data, the elliptic curve cryptographic process based on an elliptic curve over a finite field, wherein the generation of the output data comprises generating, based on a predetermined point V of the elliptic curve and a positive R-bit integer k, a first point of the elliptic curve that is based, at least in part, on the point kV of the elliptic curve, wherein $k=\Sigma_{r=0}^{R-1} 2^r b_r$ and, for each $r=0, 1, \ldots, R-1$, $b_r$ is the bit value of k at bit position r of k, wherein the method comprises:

storing, according to a partition of the R bit positions for k into T groups of bit positions $P_t$ ($t=0, 1, \ldots, T-1$), a corresponding lookup table $L_t$ having, for each of the $2^{|P_t|}$ possible options for assigning to the $|P_t|$ bit positions $s \in P_t$ a respective bit value $x_s$, a corresponding point of the elliptic curve that is based, at least in part, on the point $(\Sigma_{s \in P_t} 2^s x_s)V$ of the elliptic curve;

obtaining k; and determining the first point as $\Sigma_{t=0}^{T-1} l_t$, where $l_t$ is the point of the elliptic curve that corresponds, in lookup table $L_t$, to the option for assigning to the $|P_t|$ bit positions $s \in P_t$ the corresponding bit value $b_s$.

\* \* \* \* \*